Feb. 28, 1956 W. M. SCHOLL 2,736,290
APPARATUS FOR MAKING ADHESIVE TAPE
Filed Dec. 18, 1952 2 Sheets-Sheet 1
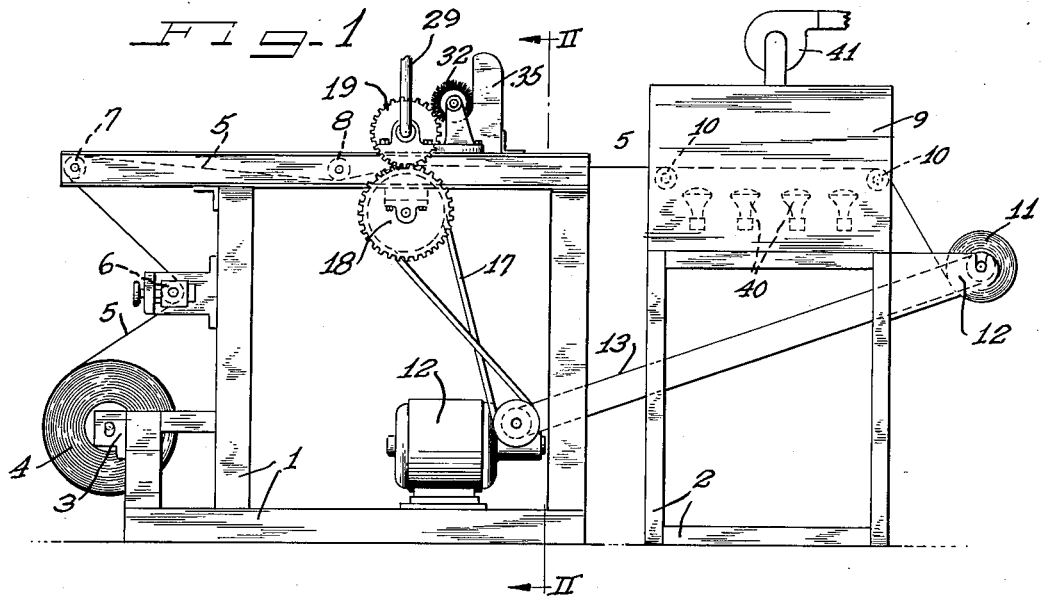
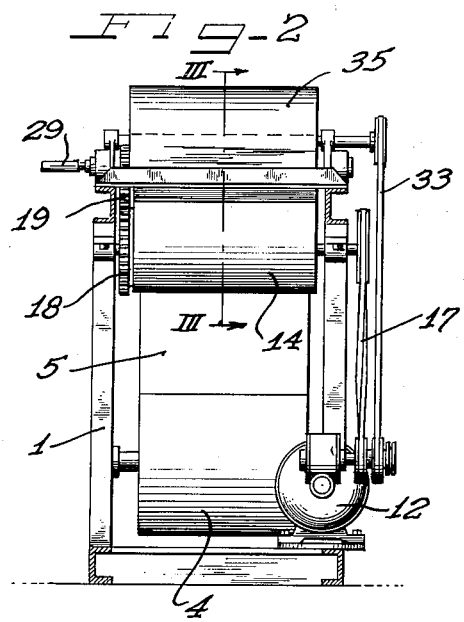
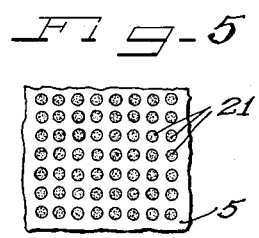
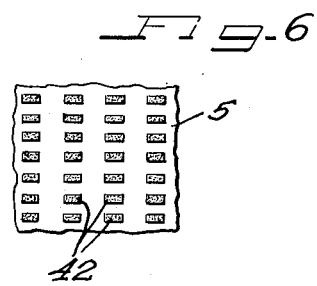
Inventor
WILLIAM M. SCHOLL Feb. 28, 1956 W. M. SCHOLL 2,736,290
APPARATUS FOR MAKING ADHESIVE TAPE
Filed Dec. 18, 1952 2 Sheets-Sheet 2
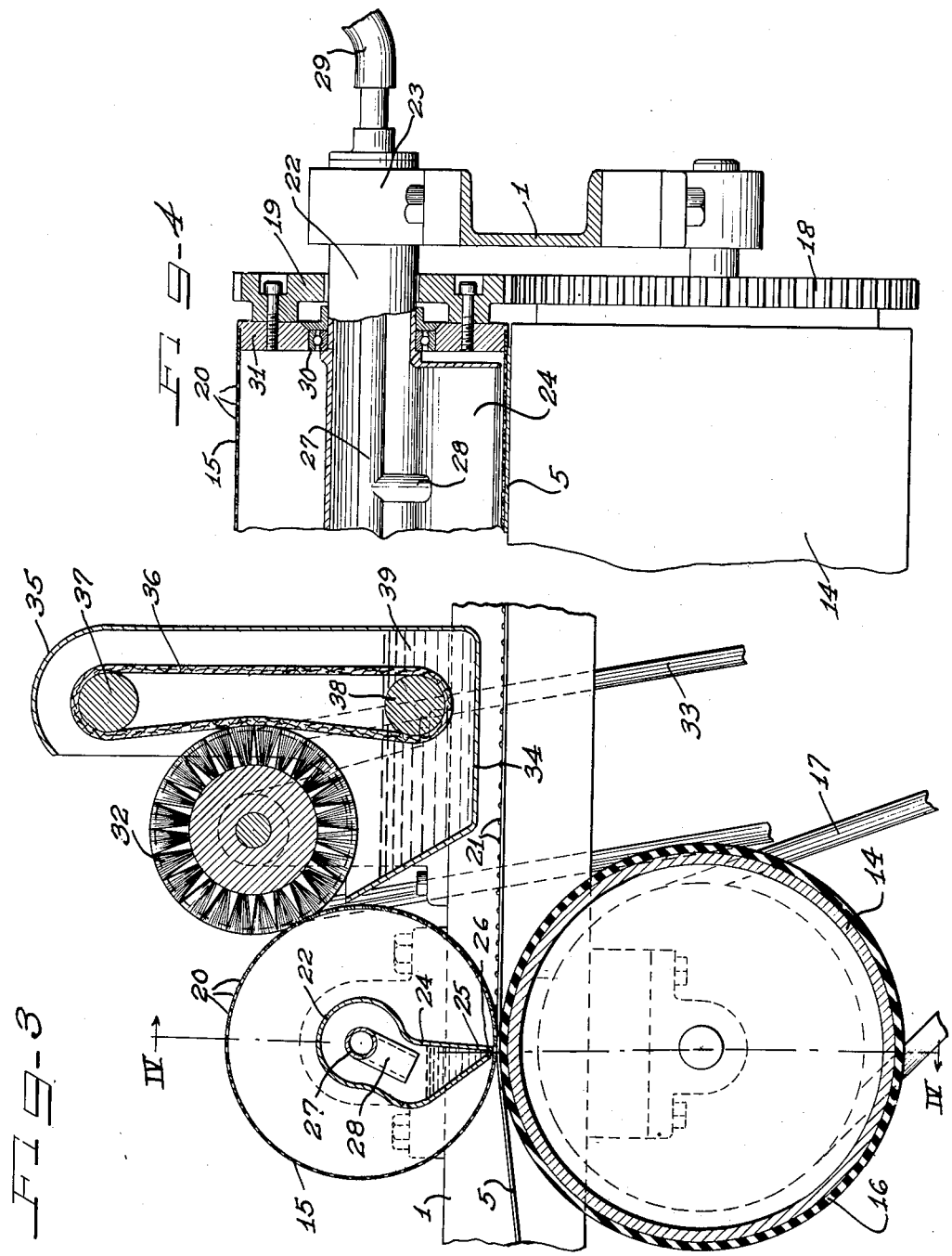
Inventor
WILLIAM M. SCHOLL
by Attys

United States Patent Office 2,736,290
Patented Feb. 28, 1956

2,736,290

APPARATUS FOR MAKING ADHESIVE TAPE

William M. Scholl, Chicago, Ill.

Application December 18, 1952, Serial No. 326,676

3 Claims. (Cl. 118—203)

This invention relates to improvements in apparatus for making adhesive tape, and more particularly to mechanism for applying an adhesive mass on a strip of fabric, felt, plastic film, paper, or other suitable material in a predetermined pattern, although the invention may have other uses and purposes as will be apparent to one skilled in the art.

In the past, many and various types of adhesive tape making apparatus have been developed, but in most instances were objectionably expensive both to build and operate satisfactorily. Further, these formerly known devices did not apply the adhesive to a strip of material in substantially any desired and predetermined pattern, and would not handle various types of economical adhesive mass, such as solvent rubber mass, synthetic compound adhesive mass, or synthetic thermoplastic adhesive compounds.

With these thoughts in mind, it is an important object of the instant invention to provide apparatus for making adhesive tape, which apparatus does not embody any complicated or expensive equipment and which applies the adhesive mass to a backing strip in substantially any desired predetermined pattern.

Also an object of the invention is the provision of apparatus for making adhesive tape, wherein the adhesive itself is applied to the backing strip in a predetermined pattern of spaced applications, leaving certain portions of the strip uncovered with adhesive, thus rendering the adhesive tape easier to handle during manufacture and packaging, and also more desirable for application to the human body, or to other substances or surfaces where temporary application may be desirable and ease of removal is an attribute.

Still another object of the invention is the provision of apparatus for making adhesive tape, which apparatus embodies continuously operating means for applying adhesive to a traveling backing strip, the apparatus being suitable for the application of substantially any desired character of adhesive mass.

Still another feature of the invention resides in the provision of apparatus for making adhesive tape wherein the adhesive mass is applied to a backing strip through perforations or openings in a revolving cylinder or roll.

Still another object of the invention resides in the provision of apparatus for making adhesive tape, which apparatus embodies a relatively thin walled roll or drum having numerous perforations therethrough with means to rotate the drum, and stationary means inside the drum to force adhesive through the perforations onto a backing strip.

Still a further feature of the invention resides in the provision of apparatus for making adhesive tape, which apparatus embodies a rotating drum or cylinder having numerous perforations through the wall thereof with the perforations shaped in the ultimately desired pattern of application for the adhesive mass which is forced through the drum wall onto a backing strip.

While some of the more salient features, characteristics and advantages of the instant invention have been above pointed out, others will become apparent from the following disclosures, taken in conjunction with the accompanying drawings, in which—

Figure 1 is a fragmentary side elevational view of adhesive tape making apparatus embodying principles of the instant invention;

Figure 2 is a transverse vertical sectional view taken substantially as indicated by the line II—II of Fig. 1, looking in the direction of the arrows;

Figure 3 is an enlarged fragmentary longitudinal vertical sectional view taken substantially as indicated by the line III—III of Fig. 2;

Figure 4 is a fragmentary transverse vertical sectional view taken substantially as indicated by the line IV—IV of Fig. 3;

Figure 5 is a fragmentary face view of the adhesive side of one form of finished adhesive tape; and Figure 6 is a view similar in character to Fig. 5 but showing a different pattern or arrangement of adhesive on the tape or backing strip.

As shown on the drawings:

Herein, where the term tape is utilized to indicate the backing strip or element carrying the adhesive in adhesive tape, the word is to include a strip or sheet of any desired width of fabric, felt, plastic film, paper, or other material suitable for carrying an adhesive coating. Usually in the manufacture of adhesive tape and similar products, the backing material is between 36 and 60 inches wide, and after the tape is formed of that width, it is then severed into the desired individual widths and wound on spools for sale.

In the illustrated embodiment of the instant invention, with particular reference to Figs. 1 and 2, it will be seen that the structure embodies a main frame generally indicated by numeral 1, and an auxiliary frame indicated by numeral 2. Each of these frames may be fabricated from angle or channel members, uprights and cross members being located wherever needed in the usual manner of frame construction, and the two frames might be incorporated into a unitary structure, if so desired.

Mounted for free rotation in a cradle 3 on the frame 1 is a supply roll 4 of a tape or backing strip 5. This strip 5 passes around an adjustable tensioning roll 6, and then travels over a guide roll 7 to pass generally laterally through the bed portion of the machine. In thus traveling, the tape or strip 5 next passes underneath a guide roller 8, thence by adhesive applying mechanism to be later described, and the adhesive tape then travels through a suitable drier 9 having guide rolls 10 therein to be wound on a finished tape receiving roll 11 carried in a cradle 12 on the auxiliary frame 2 and driven in any suitable manner such as by an electric motor 12 through diagrammatically indicated belt means 13. The various guide rollers are preferably idlers and rotate by virtue of frictional contact of the tape or strip therewith.

As the tape 5 passes along the bed portion of the machine, it is nipped between a pair of vertically superposed rolls, a backing roll 14 and an adhesive applying roll 15. With reference now to Figs. 3 and 4 it will be noted that the backing roll is preferably of greater diameter than the applying roll 15, and this backing roll may well be surfaced with a rubber or other resilient coating as indicated at 16 to insure a little more than mere line contact of the tape 5 with the applying roll 15 as the tape passes through the bight or nip of the rolls. The backing roll 14 may be driven through a suitable belt and pulley arrangement 17, and preferably on the other end is provided with a gear 18 meshing with a gear 19 on the end of the tape applying roll 15, as seen in Figs. 1 and 2. These gears insure synchronism in the speed of the rolls, so as to insure constant and correct bearing of the rolls on the strip 5 during application of the adhesive thereto.

As seen in Figs. 3 and 4, the applying roll or cylinder 15 is of relatively thin material and provided with numerous openings or apertures 20 therein. The shape and location of the apertures 20 determine the ultimate pattern of adhesive applied to the tape 5. In the instance of the showing in Figs. 3 and 4 the apertures are round and so arranged that spaced dots of adhesive is applied to the fabric 5 in a relatively even pattern as indicated at 21 in Fig. 5. In applying the adhesive to the tape, the adhesive mass is forced through the apertures in the cylinder 15 and picked up by the tape traveling therebeneath as exemplified by the showing in Fig. 3. The more than mere line contact provided by the larger backing roll 14 insures a withdrawing of the viscous adhesive from the apertures in the applying roll by an action that may be likened to suction so that adhesive does not clog the apertures by gradually building up an accumulation.

Inside the rotary cylinder 15 is a stationary hollow shaft 22, Figs. 3 and 4, fixedly mounted in the frame as indicated at 23. This shaft is preferably a single casting and includes an inner and integral substantially V-shaped hopper 24 depending therefrom to carry a supply of adhesive. The lower end of this hopper is provided with an elongated outlet slot as indicated at 25 in Fig. 3 through which the adhesive exits. As also indicated in the same figure, one side of the hopper is extended as at 26 to function as a doctor blade and forces the adhesive mass through the apertures 20. Preferably this doctor blade acts at a point immediately adjacent or just prior to where the rolls 15 and 16 nip the strip 5. It will be noted from the showing in Fig. 3 that the other side of the hopper is inclined inwardly toward the nip of the rolls, while the side carrying the doctor blade is almost straight, so that the adhesive is fed out through the slot 25 but against the doctor blade.

Adhesive is supplied to the hopper 24 by way of a stationary pipe 27 which extends through the hollow shaft 22 and is provided with several discharge nozzles as indicated at 28. This pipe is connected by a flexible hose 29 or otherwise to a source of adhesive supply, such as a pump associated with a churning mixer, not illustrated in the drawings. That arrangement provides a continuous supply of properly admixed adhesive mass for the hopper 24. Usually adhesive of the character embodied in adhesive tape is relatively viscous in comparison to many other substances, and in this instance the adhesive will have a viscosity of 40 to 60 centistokes per minute at 20 degrees centigrade. At 375° F. it has substantially the consistency of molasses.

As seen in Fig. 4, the rotary cylinder 15 revolves on bearings 30 mounted on the stationary shaft 22, there being an end plate 31 on the cylinder connected to the aforesaid gear 19. Thus, the cylinder 15 is freely rotatable, while the adhesive supplying structure therein remains stationary.

Also as seen in Fig. 3, means are provided for cleaning the apertures 20 in the cylinder 15 to make sure that these apertures remain open and in proper condition to pass adhesive therethrough at all times. With certain forms of adhesive the cleaning means may not be necessary, and with other forms or compounds it may be desirable to use them. In the illustrated embodiment, the cleaning means include a rotary brush 32 which may be driven from the aforesaid motor 12 by a suitable belt and pulley arrangement 33. The brush is disposed over a vat 34 which has an upstanding and laterally walled hood 35 thereon to prevent splashing. Inside the hood 35 is an endless belt 36 trained over a pair of idler rolls 37 and 38, the roll 38 being disposed below the surface of a quantity of suitable solvent 39 in the vat 34. This belt 36 is preferably made of wicking, and rotates by virtue of brush contact therewith. The liquid 39 may be in the nature of a volatile oil for cleansing the rotary cylinder 15, or it may be in the form of an adhesive solvent, depending upon the character of adhesive used. It will be noted that the location of the brush is shortly after the adhesive passing through the cylinder 15 is picked up by the strip 5, and there is ample time for the liquid to dry before adhesive again contacts that particular portion of the cylinder.

In operation, the apparatus is extremely simple. As the strip or tape 5 passes along under proper tension, it is given good contact with the upper surface of the backing roll 14 by passing under the guide roll 8, and the adhesive is deposited through the openings 20 of the cylinder 15 at the nip of the two rolls, the tape picking up the particular pattern of adhesive defined by the openings in the cylinder 15. This cylinder is maintained clean by the brush, if necessary, and the supply of adhesive to the cylinder is constant, so that operation is continuous and relatively rapid. When the adhesive tape leaves the nip of the rolls, it next passes through the drying oven 9 and the adhesive is dried to the desired extent by any suitable means, such as infra red lamps diagrammatically indicated at 40. An exhaust fan arrangement 41 removes any solvent that may be contained in the adhesive, so that when the adhesive tape leaves the oven 9 it may readily be wound on the receiving roll 11 for later slitting and packaging in the proper widths and lengths.

In Fig. 6 I have illustrated an adhesive tape having rectangular spaced dabs or applications of adhesive designated by numeral 42, for the purpose of more clearly indicating that substantially any desired pattern of adhesive application may be provided by merely shaping the openings in the drum 15 in accordance with the contemplated pattern.

From the foregoing it is apparent that I have provided durable apparatus of simple construction, highly economical to construct and operate, and which effectively provides a desired pattern of adhesive on a backing strip, utilizing substantially any adhesive compound that may be spread from a mass.

It will be understood that modifications and variations may be effected without departing from the scope of the novel concepts of the present invention.

I claim as my invention:

1. An adhesive tape making apparatus designed to apply a viscous adhesive mass of a viscosity exceeding 35 centistokes per minute at 20° C. on a backing strip, consisting of a set of rolls between which a backing strip passes, said rolls comprising a backing roll and an adhesive applying roll, said applying roll being relatively thin and provided with numerous apertures therein, means to feed adhesive inside said applying roll, and doctor means to force the adhesive through the apertures into contact with said strip, said backing roll having a resilient cover and being of larger diameter than the applying roll to provide more than mere line contact between the rolls to effect a withdrawing action on the adhesive through the apertures in the applying roll akin to suction.

2. In adhesive tape making apparatus, an adhesive applicator comprising a roll having numerous perforations therein, means to rotate said roll, a hollow stationary shaft extending through said roll, a hopper for adhesive carried by said shaft in said roll, a backing roll, means for feeding a strip between said rolls, said hopper having an opening therein to discharge adhesive against the inside of said perforated roll adjacent the nip of the rolls, and a pipe extending into said hollow shaft to supply said hopper with adhesive from an external source of supply, and a cleansing brush acting against the perforated roll after the deposition of adhesive from the roll onto the strip.

3. In adhesive tape making apparatus, a set of rolls between which a backing strip passes, said rolls comprising a backing roll and an adhesive applying roll, said applying roll being relatively thin and provided with numerous apertures therein, means to feed adhesive inside said applying roll, doctor means to force the adhesive through the apertures into contact with said strip, said backing roll having a resilient cover and being of larger diameter than the applying roll to provide more than a mere line contact with the backing strip at the nip of the rolls, and a cleansing brush acting directly upon the applying roll following the deposition of adhesive on the backing strip.

References Cited in the file of this patent

UNITED STATES PATENTS

| | | |
|---|---|---|
| 184,640 | Marble | Nov. 21, 1876 |
| 1,347,066 | Vuono | July 20, 1920 |
| 1,541,806 | Flick | June 16, 1925 |

FOREIGN PATENTS

| | | |
|---|---|---|
| 478,013 | France | Aug. 26, 1915 |